US011517108B2

(12) United States Patent
Brendel et al.

(10) Patent No.: US 11,517,108 B2
(45) Date of Patent: Dec. 6, 2022

(54) CONNECTOR BRACKET AND SYSTEM COMPRISING A CONNECTOR BRACKET ADAPTED TO FORM PART OF A LOCKING ARRANGEMENT (71) Applicant: Inter IKEA Systems B.V., Delft (NL)

(72) Inventors: Stefan Brendel, Markaryd (SE); Daniel Schon, Kalvsvik (SE); Johan Northfell, Karlshamn (SE)

(73) Assignee: Inter IKEA Systems B.V., LN Delft (NL)

( * ) Notice: Subject to any disclaimer, the term of this patent is extended or adjusted under 35 U.S.C. 154(b) by 0 days.

(21) Appl. No.: 16/617,220

(22) PCT Filed: May 29, 2018

(86) PCT No.: PCT/SE2018/050533
§ 371 (c)(1),
(2) Date: Nov. 26, 2019

(87) PCT Pub. No.: WO2018/222113
PCT Pub. Date: Dec. 6, 2018

(65) Prior Publication Data
US 2020/0146447 A1 May 14, 2020

(30) Foreign Application Priority Data
May 29, 2017 (SE) .................... 1750667-6

(51) Int. Cl.
*A47B 88/95* (2017.01)
*A47B 88/90* (2017.01)
(52) U.S. Cl.
CPC ............. *A47B 88/95* (2017.01); *A47B 88/90* (2017.01); *A47B 2088/951* (2017.01); *A47B 2088/953* (2017.01); *A47B 2088/954* (2017.01)

(58) Field of Classification Search
CPC ... A47B 88/944; A47B 88/0044; A47B 88/95; A47B 88/0051; A47B 88/956;
(Continued)

(56) References Cited

U.S. PATENT DOCUMENTS

| 3,303,937 A | 2/1967 | McConnell |
| 3,346,126 A | 10/1967 | Milton et al. |

(Continued)

FOREIGN PATENT DOCUMENTS

| CA | 2877372 A1 | 7/2016 |
| CN | 102196747 A | 9/2011 |

(Continued)

OTHER PUBLICATIONS

International Search Report for International Application No. PCT/SE2018/050533 dated Aug. 22, 2018 (4 pages).

(Continued)

*Primary Examiner* — Andrew M Roersma
(74) *Attorney, Agent, or Firm* — Merchant & Gould P.C.

(57) ABSTRACT

A system is provided comprising a first furniture part (200) and a locking arrangement comprising a connector bracket (1) and a locking element (4). The first furniture part (200) comprises a recess (201) having an oblong shape comprising an insertion portion (203) and a locking portion (204), wherein the locking portion (204) along an inner wall comprises a groove (207). The connector bracket (1) comprises a base portion (2) having an extension adapted to extend along the first furniture part (200), and at least one protrusion (3) having a longitudinal extension extending transverse the extension of the base portion (2) and comprising a rim (7) extending transverse the longitudinal extension of the protrusion (3). The protrusion (3) is configured to be inserted into the insertion portion (203) and to be movable from the insertion portion (203) to the locking (Continued)

portion (204) by applying a force to the connector bracket (1) in a direction transverse to the longitudinal extension of the protrusion (3), whereby the rim (7) engages the groove (207). The locking element (4) being a flexible tongue (4) is integral with the connector bracket (1) and is configured to be inserted into the insertion portion (203), thereby preventing the protrusion (3) from being moved from the locking portion (204) to the insertion portion (203) and thereby releasing its engagement with the groove (207). The locking element (4) is configured to form a safety lock adapted for acting against a portion of an envelope surface of the protrusion (3) facing the insertion portion (203) of the recess (201). Also, a connector bracket and the use of such connector bracket is disclosed.

11 Claims, 7 Drawing Sheets

(58) Field of Classification Search
CPC .......... A47B 88/0055; A47B 2088/951; A47B 2088/0059; A47B 2088/952; A47B 2088/0062; A47B 2088/953; A47B 2088/0066; A47B 2088/954; A47B 2088/007; A47B 2088/955; A47B 2088/0074; A47B 2210/09
See application file for complete search history.

(56) References Cited

U.S. PATENT DOCUMENTS

| | | | |
|---|---|---|---|
| 3,427,919 A | 2/1969 | Leric | |
| 3,462,126 A | 8/1969 | Demanega | |
| 3,954,345 A | 5/1976 | Morris | |
| 4,815,798 A * | 3/1989 | Rock | A47B 88/95 312/263 |
| 5,895,103 A * | 4/1999 | Huber | A47B 88/956 312/348.4 |
| 5,938,367 A | 8/1999 | Olson | |
| 6,234,596 B1 * | 5/2001 | Egger | A47B 88/956 312/348.4 |
| 7,207,637 B2 * | 4/2007 | Huang | A47B 88/956 312/263 |
| 2004/0195122 A1 | 10/2004 | Awaji | |
| 2013/0239509 A1 | 9/2013 | Wang | |
| 2014/0034593 A1 | 2/2014 | Chen | |
| 2014/0205373 A1 * | 7/2014 | Andersson | F16B 12/125 403/364 |
| 2016/0108945 A1 | 4/2016 | Yang | |

FOREIGN PATENT DOCUMENTS

| | | | | |
|---|---|---|---|---|
| CN | 103946561 A | 7/2014 | | |
| CN | 104039199 A | 9/2014 | | |
| CN | 204003837 U | 12/2014 | | |
| DE | 9109647 U1 * | 3/1992 | .......... A47B 88/956 |
| DE | 9215030 U1 * | 2/1993 | ............ A47B 88/95 |
| DE | 20206627 U1 | 8/2002 | | |
| DE | 10 2010 051372 A1 | 5/2012 | | |
| DE | 202011106766 U1 * | 1/2013 | ............ A47B 88/95 |
| GB | 1201076 A | 8/1970 | | |
| GB | 2428078 A | 1/2007 | | |
| WO | 2016071008 A1 | 5/2016 | | |
| WO | WO-2016071008 A1 * | 5/2016 | ............. F16B 12/22 |
| WO | 2016137385 A1 | 9/2016 | | |

OTHER PUBLICATIONS

Chinese Office Action for CN Application No. 201880035490.5 dated Dec. 31, 2020 (7 pages), English Translation.
Extended European Search Report for EP Application No. 18810682.7 dated Jan. 29, 2021 (6 pages).

* cited by examiner

CONNECTOR BRACKET AND SYSTEM COMPRISING A CONNECTOR BRACKET ADAPTED TO FORM PART OF A LOCKING ARRANGEMENT

This application is a National Stage Application of PCT/SE2018/050533, filed 29 May 2018, which claims benefit of Ser. No. 1750667-6, filed 29 May 2017 in Sweden and which applications are incorporated herein by reference. To the extent appropriate, a claim of priority is made to each of the above disclosed applications.

TECHNICAL FIELD

The invention refers to a system comprising a first furniture part and a locking arrangement comprising a connector bracket and a locking element. Also, the invention refers to a connector bracket and the use of such connector bracket.

TECHNICAL BACKGROUND

It is well known in the art to provide furniture or furniture parts which are provided to the end consumer as a flat package and where the end consumer herself performs the assembling. Although the connecting members and brackets to a large extent may be standardized in terms of the tooling that is required, it still causes problems to the end consumer since most brackets require connecting means such as screws which are small and easily lost. There is thus a need for a bracket solution that reduces the number of connecting means.

It is also well known to intermix different types of materials to provide certain properties to the furniture or furniture part. One typical example is a drawer where the front wall is provided by solid wood or fiber board and where the respective sidewalls are made of pressed sheet metal. Another example is wardrobes which typically offer a broad choice of different fittings to the end consumer, many of the fittings involving portions of sheet metal. By using sheet metal for some portions certain functions and properties may be easily integrated, such as guides and reinforcements. Sheet metal further allows easy forming of integrated tongues or flanges which may be useful to facilitate the assembly. The combination of different materials does however require other connecting means than those that are suitable for mounting one wood based object to another wood based object, such as dowels. Further, sheet metal often necessitates the need for extra brackets and mechanical connecting means such as washers, screws and nuts to allow a durable mounting. Not only does it add to the overall cost and complexity of the product, but it also easily causes stress to the end-consumer who should perform the assembling.

Thus, there is a need for a bracket solution that allows an easy connection of a first and a second furniture part and especially where at least a portion of one of them comprises a thin-walled connecting portion.

SUMMARY

One object of the invention is to provide a connector bracket that allows an easy mounting, dis-mounting and re-mounting of the connector bracket to a first furniture part.

Another object is to provide a connector bracket that can be used to interconnect a first and a second furniture part, where at least a portion of the second furniture part comprises a thin-walled connecting portion.

Yet another object is to provide a connector bracket that can be manually operated without the need for any tooling.

These and other objects are solved by a first furniture part and a locking arrangement comprising a connector bracket and a locking element, wherein the first furniture part comprises a recess having an oblong shape comprising an insertion portion and a locking portion, wherein the locking portion along an inner wall comprises a groove; the connector bracket comprises a base portion having an extension adapted to extend along the first furniture part, and at least one protrusion having a longitudinal extension extending transverse the extension of the base portion and comprising a rim extending transverse the longitudinal extension of the protrusion; wherein the protrusion is configured to be inserted into the insertion portion of the recess and to be movable from the insertion portion to the locking portion by applying a force to the connector bracket in a direction transverse to the longitudinal extension of the protrusion, whereby the rim engages the groove in the inner wall of the locking portion, thereby counteracting relative movement between the first furniture part and the connector bracket along the longitudinal extension of the protrusion; and wherein the locking element is integral with the connector bracket and is configured to be inserted into the insertion portion of the recess, thereby preventing the protrusion from being moved from the locking portion to the insertion portion and thereby releasing its engagement with the groove, and wherein the locking element is a flexible tongue which, when the locking element has been inserted into the insertion portion, is configured to form a safety lock adapted for acting against a portion of an envelope surface of the protrusion facing the insertion portion of the recess.

By the present invention, a connector bracket is provided that is fully manually operable and which provides a robust and durable connection of the connector bracket to a first furniture part. This applies no matter if it is the first time that the connector bracket is mounted to the first furniture part or if it should be a re-assembly. The connector bracket can be used no matter type of material in the first furniture part. The connector bracket is intuitively operated by linear movements in two directions which movements are provided manually without the need for any tools or connecting means. This applies both to locking and un-locking. Provision of a simple un-locking is favorable since it allows an easy refurnishing/face-lift of e.g. a drawer where the front easily can be changed or an easy change or re-positioning of equipment in a wardrobe. In the event the connector bracket comprises more than one protrusion, the connector bracket is prevented from rotating in view of the first furniture part. The skilled person does however understand that one protrusion may be sufficient and that the locking element may prevent the connector bracket from rotating. The locking element provides a safety function that prevents the connector bracket from accidentally being displaced from its locking position.

The flexible tongue will due to its flexibility strive to prevent the protrusion from being moved from the locking portion to the insertion portion and thereby releasing its engagement with the groove.

The system may further comprise a second furniture part, wherein the second furniture part comprises a thin-walled portion having at least one through-going hole, and wherein the protrusion is configured to be inserted into and extend through a respective through-going hole before being inserted into the insertion portion of the recess. Thereby the connector bracket provides an easy locking arrangement between two furniture parts, one of them comprising a thin walled portion. The thin walled portion of the second furniture part may be an integral part thereof, such as a flange of a pressed sheet metal furniture part. The thin-walled portion may also be a bracket that is attached to a furniture part, which furniture part as such may be made of a different material than the thin-walled portion. Depending on orientation of the thin-walled element, the system can be used to interconnect two furniture parts at an angle to each other. One and the same connector bracket can be used no matter extension of the thin-walled portion.

The locking element may comprise a shoulder which is configured to, when the locking element has been inserted into the insertion portion, abut a surface of the second furniture part facing the first furniture part. The operator may receive an audial confirmation by a "click sound" as the shoulder is moved past the thin-walled portion.

The connector bracket may further comprise an actuator facilitating force transfer to the connector bracket in a direction transverse the longitudinal extension of the protrusion when moving the connector bracket to a locking position. The actuator may by way of example be provided as a tab against which the operator may apply a force by his/her thumb. The flexible tongue may by way of example be arranged at one end of the connector bracket and the actuator at the opposite end of the connector bracket. The actuator may be arranged at a free end of the connector bracket.

According to another aspect, a connector bracket adapted to form part of a locking arrangement configured to lockingly interconnect the connector bracket with at least a first furniture part is disclosed. The first furniture part comprises a recess having an oblong shape comprising an insertion portion and a locking portion, wherein the locking portion along an inner wall comprises a groove; the connector bracket comprising: a base portion having an extension adapted to extend along the first furniture part, and at least one protrusion having a longitudinal extension extending transverse the extension of the base portion and comprising a rim extending transverse the longitudinal extension of the protrusion; wherein the protrusion is configured to be inserted into the insertion portion of the recess and to be movable from the insertion portion to the locking portion by moving the connector bracket in a direction transverse to the longitudinal extension of the protrusion, whereby the rim engages the groove in the inner wall of the locking portion, thereby counteracting relative movement between the first furniture part and the connector bracket along the longitudinal extension of the protrusion; and a locking element which is integral with the connector bracket and which comprises a flexible tongue adapted to be movable between an unlocked position and a locked position, wherein the flexible tongue in the locked position is arranged to extend into the insertion portion of the recess of the first furniture part, and wherein the flexible tongue, when the locking element has been inserted into the insertion portion, is configured to form a safety lock adapted for acting against a portion of an envelope surface of the protrusion facing the insertion portion of the recess.

The advantages provided by the connector bracket as such have been thoroughly discussed above in terms of a system using such connector bracket. To avoid undue repetition reference is therefore made to the sections above.

The base portion may comprise two protrusions arranged on a distance from each other as seen along the extension of the base portion. By the base portion comprising two protrusions, the connector bracket is prevented from rotating in view of the first furniture part when mounted thereto. Alternatively, the base portion may comprise three or more protrusions. Such three or more protrusions may be arranged along a single line or in an array.

The at least one protrusion is adapted to be inserted into and extend through a respective through-going hole of a thin-walled portion of a second furniture part before being inserted into the insertion portion of the recess of the first furniture part.

The flexible tongue may comprise a shoulder configured to, when the flexible tongue has been moved to its locked position, abut a surface of the second furniture part facing the first furniture part.

The connector bracket may further comprise an actuator configured to facilitate force transfer to the connector bracket in a direction transverse the longitudinal extension of the protrusion.

According to yet another aspect, the invention refers to the use of a connector bracket with the features given above to lockingly interconnect a first and a second furniture part. Non-limiting examples of furniture parts are drawers, joists, pedestals, sockets, and fittings used in e.g. a wardrobe. The connector bracket may be arranged to engage at least one through-going hole in a thin-walled portion of the second furniture part.

The advantages provided by the connector bracket as such have been thoroughly discussed above, both in terms of a system using such bracket and in terms of the connector bracket alone. The same advantages apply equally well for the use of such connector bracket. To avoid undue repetition reference is therefore made to the sections above.

Further objects and advantages of the present invention will be obvious to a person skilled in the art reading the detailed description given below describing different embodiments.

BRIEF DESCRIPTION OF THE DRAWINGS

The invention will be described in detail with reference to the schematic drawings.

DETAILED DESCRIPTION

Figure 1:
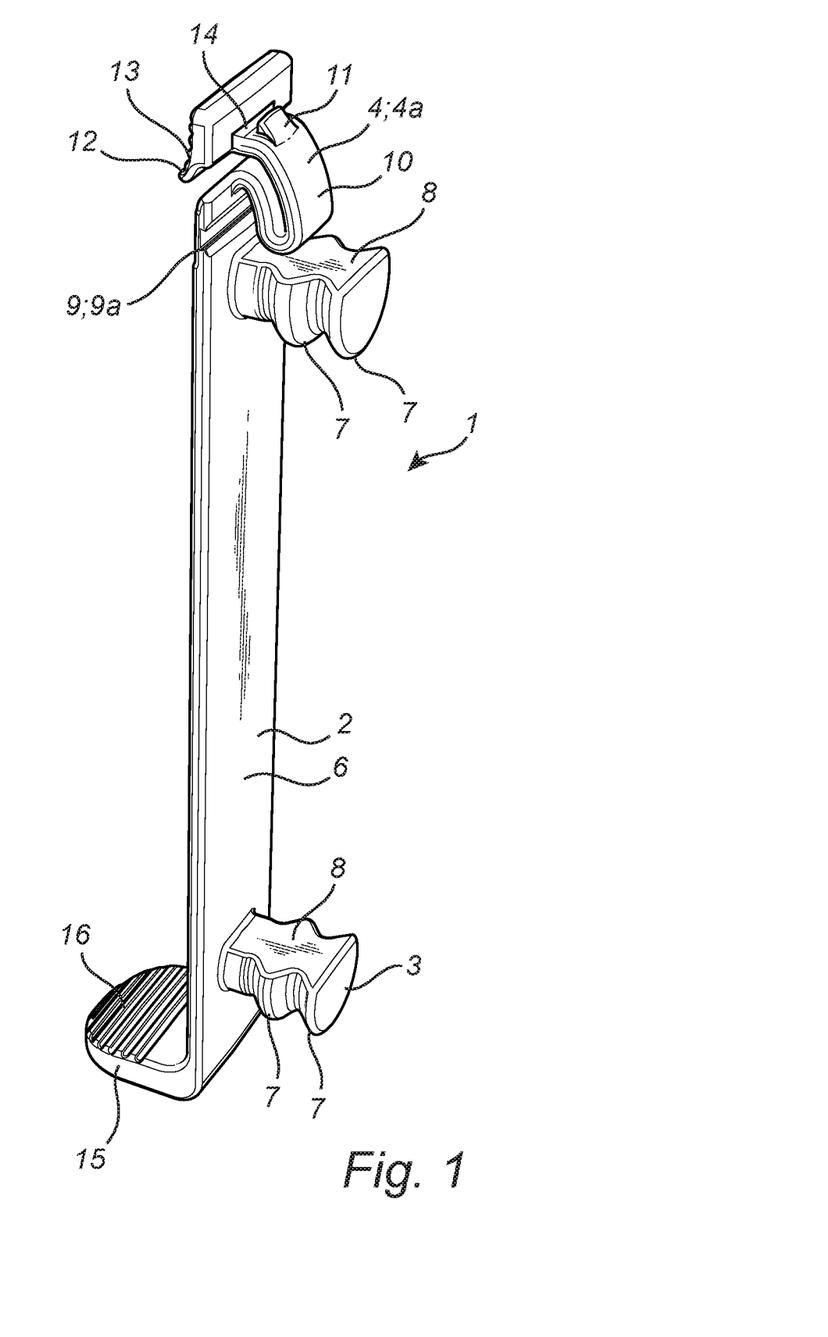
FIG. 1 discloses a connector bracket.
Figure 2A:
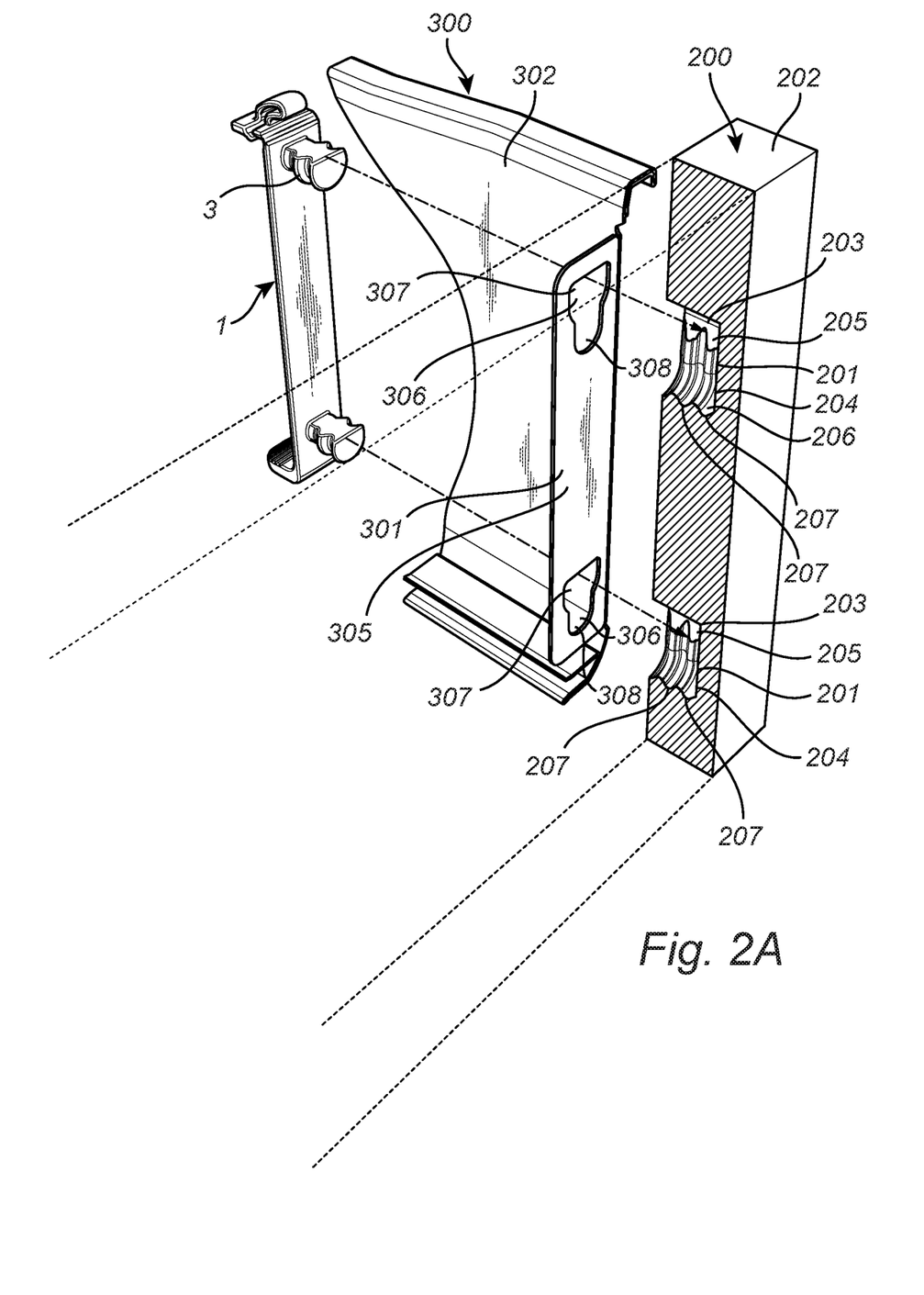
FIGS. 2A-2F discloses the interaction between the connector bracket, a first furniture part and the thin-walled portion of a second furniture part.

Now turning to FIGS. 1 and 2A, one embodiment of the connector bracket 1 is disclosed. The connector bracket 1 is adapted to form part of a system 100 comprising a first furniture part 200. The system 100 may further comprise a second, optional furniture part 300 comprising a thin-walled portion 301. In the description to follow the system will be exemplified as being used in a drawer where the first furniture part 200 constitutes the front panel and the second furniture part 300 with its thin-walled portion 301 constitutes a side wall. The connector bracket 1 is used to interconnect the first and second furniture parts 200, 300.

The disclosed connector bracket 1 comprises a base portion 2, two protrusions 3 and a flexible tongue 4a. The connector bracket 1 may be formed as a unitary body by injecting molding a plastic material. It is to be understood that the connector bracket 1 can be provided with one protrusion 3 only.

The base portion 2 is in the disclosed embodiment formed as a longitudinally extending body having two opposing surfaces forming a front surface 5 and a rear surface 6. The front surface 5 is configured to face away from the first furniture part 200 when the connector bracket 1 is mounted to the first furniture part 200. Also, when the connector bracket 1 is mounted to the first furniture part 200, the rear surface 6 is arranged to abut and extend in parallel with a major surface of the first furniture part 200. The rear surface 6 is substantially flat.

The protrusions 3 are arranged on the rear surface 6 of the base portion 2. The protrusions 3 form male locking means. The protrusions 3 have a longitudinal extension extending transverse the extension of the base portion 2. The protrusions 3 are adapted to be inserted into a respective recess 201 in the first furniture part 200. If a second furniture part 300 is present, the protrusions 3 are arranged to be inserted into and extend through respective through-going holes 306 of the thin-walled portion 301 of the second furniture part 300 before being inserted into the recesses 201.

Each protrusion 3 comprises at least one rim 7 that extends transverse the longitudinal extension of the protrusion 3. In the disclosed embodiment, each protrusion 3 comprises two rims 7 which are arranged one after the other along the longitudinal extension of the protrusion 3. It is to be understood that the number of rims 7 may be at least one with remained function. The rims 7 constitute locking means to be discussed below.

The protrusions 3 are disclosed as being provided with a chamfering 8 providing the protrusions 3 with a non-rotational cross section. Thus, the rims 7 are only provided along a portion of the envelope surface of the protrusion 3. The portion of the envelope surface that is provided with the rims 7 is arranged on the part of the envelope surface that faces away from a flexible tongue 4a to be described below. Although the protrusions 3 are disclosed as having a chamfered cross section, it is to be understood that other cross sections are possible, such as a circular cross section.

A locking element 4 formed as a flexible tongue 4a is arranged on a first end of the base portion 2. The flexible tongue 4a is adapted to be movable between a released position and a locking position to be discussed in detail below. When set to the locking position, the flexible tongue 4a is arranged to extend through one of the through-going holes 306 in the thin-walled portion 301 of the second furniture part 300 and into a recess 201 of the first furniture part 200. To allow this movability of the flexible tongue 4a, the transition between the base portion 2 and the flexible tongue 4a is provided with a waist portion 9 having a locally reduced thickness. The waist portion 9 forms a hinge 9a.

The flexible tongue 4a comprises a bent neck portion 10 that is arranged to project towards the rear surface 6 of the base portion 2. The bent neck portion 10 is provided with a shoulder 11. The flexible tongue 4a is, at its free end provided with a tongue actuator 12. The tongue actuator 12 may be provided with a grip-enhancing portion 13. As an operator applies a force to the tongue actuator 12, the flexible tongue 4a will bend along the hinge 9a, whereby the flexible tongue 4a will pivot towards the rear surface 6 of the base portion 2.

A gap 14 is arranged between the shoulder 11 and the tongue actuator 12. The gap 14 has a width that corresponds to the material thickness of the thin-walled portion 301 of the second furniture part 300.

The connector bracket 1 further comprises an actuator 15. The actuator 15 is provided as a tab 16 projecting from the front surface 5 of the base portion 2. The actuator 15 is disclosed as being arranged at a second end of the connector bracket 1, i.e. at an end opposite the flexible tongue 4a. It is however to be understood that other positions are possible with remained function. The actuator 15 may be provided with a grip-enhancing portion 16 to facilitate operation of the connector bracket 1. The purpose of the actuator 15 is to facilitate force transfer to the connector bracket 1 in a direction transverse the longitudinal extension of the protrusions 3 when moving the connector bracket 1 to a locking position as will be discussed below.

Figure 3:
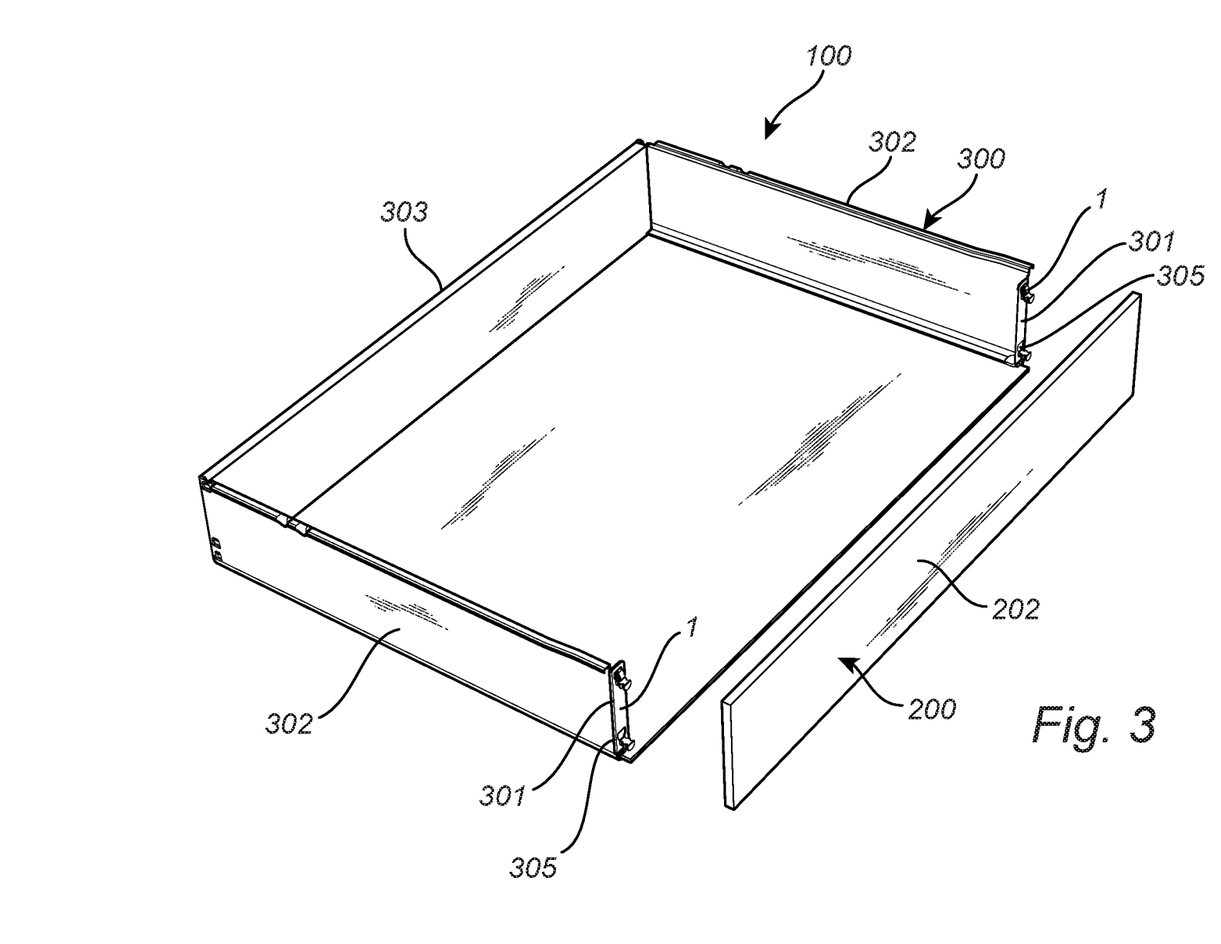
FIG. 3 discloses the connector bracket as used to interconnect the side walls of a drawer with a front.

Now turning to FIG. 3 an exploded view of a system 100 using the connector bracket 1 of the above type is disclosed. The system 100 is exemplified as a drawer. It is however to be understood that the connector bracket 1 with remained function may be used also to other types of furniture or furniture parts.

The system 100 comprises two connector brackets 1, a first furniture part 200 which in the exemplified drawer is intended to form a front wall 202 and a second furniture part 300 forming part of one of two opposing side walls 302. The drawer additionally comprises a rear wall 303 and a bottom wall 304.

The two opposing side walls 302 may be formed by any suitable material, such as fiberboard, solid wood, plastic material or a thin-walled material such as sheet metal. Each side wall 302 comprises a thin-walled portion 301 forming a flange 305 extending essentially perpendicular to the major plane of the respective side wall 302. The flange 305 and hence the thin-walled portion 301 may be formed as an integral part of the side wall 302 or be mounted thereto by e.g. screwing, bolting, riveting or adhesive bonding. The flange 305 has an extension essentially in parallel with the major plane of the first furniture part 200 to be mounted thereto. It is to be understood that depending on the type of furniture, other extensions are possible.

The first furniture part 200 may be formed by any suitable material, such as fiberboard, solid wood or plastic material. The first furniture part 200 should have a thickness large enough to allow formation of the recess 201 allowing a locking engagement with the protrusions 3 of the connector bracket 1. The thickness is preferably at least 7 mm and more preferred at least 10 mm.

Now turning to FIGS. 2A-2F the interaction between the connector bracket 1 and the first and the second furniture parts 200, 300 will be discussed.

Figure 2B:
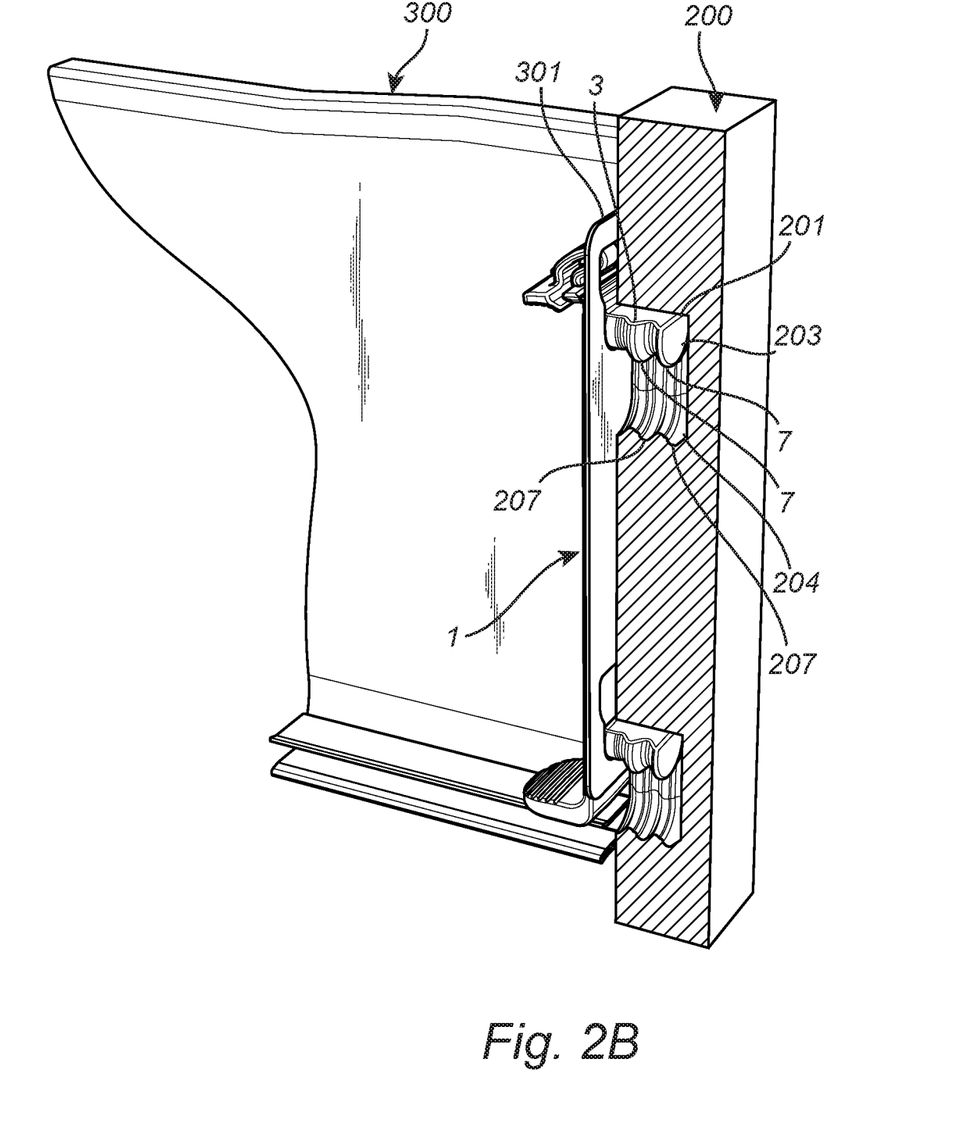

Starting with FIGS. 2A-2B, the second furniture part 300, exemplified as a portion of a side wall 302 of a drawer comprises a thin-walled portion 301 in the form of a flange 305. The thin-walled portion 301 extends perpendicular to the major extension plane of the side wall 302. Also, the thin-walled portion 301 extends towards the interior of the drawer. It is to be understood that the thin-walled portion 301 with remained function may extend in the opposite direction.

The thin-walled portion 301 comprises two through-going holes 306. Each through-going hole 306 comprises an insertion portion 307 and a locking portion 308. The insertion portion 307 and the locking portion 308 merge to form one common through-going oblong hole 306. The insertion portion 307 has a cross-section allowing linear insertion of the protrusion 3 of the connector bracket 1. The locking portion 308 preferably has a cross-section corresponding to or slightly exceeding the cross section of the protrusion 3 of the connector bracket 1 as measured in the bottom of a valley between two rims 7.

The first furniture part 200, exemplified as a front panel of a drawer 202, has a major extension in parallel with the extension of the thin-walled portion 301. To facilitate understanding, only a cross section of the first furniture part 200 is disclosed.

The first furniture part 200 comprises a recess 201 arranged in its surface facing the thin-walled portion 301. The recess 201 has a depth smaller than the thickness of the first furniture part. The recess 201 has an oblong shape comprising along its longitudinal extension an insertion portion 203 and a locking portion 204. The insertion portion 203 and the locking portion 204 merge to form the oblong recess 201.

The insertion portion 203 has a diameter exceeding the diameter of the protrusion 3 of the connector bracket 1. The inner walls 205 of the insertion portion 203 are preferably essentially smooth. The inner walls 206 of the locking portion 204 are at least along a wall portion opposite the insertion portion 203 provided with grooves 207. The number of grooves 207 corresponds to the number of rims 7 of the respective protrusion 3 of the connector bracket 1. The grooves 207 have a depth corresponding to the diameter of the rims 7 of the protrusions 3.

The recess 201 is preferably milled into the surface of the first furniture part 200. The grooves 207 may be formed during the milling.

When mounting the connector bracket 1 to the second furniture part 300, the connector bracket 1 is moved towards the thin-walled portion 301 by a linear movement perpendicular to the longitudinal extension of the thin-walled portion 301, see FIG. 2A. During this longitudinal movement, the protrusions 3 are inserted into the through-going holes 306 of the thin-walled portion 301. Also, the free ends of the respective protrusions 3 are received in the insertion portion 203 of the respective recess 201 of the first furniture part 200, see FIG. 2B.

Figure 2C:
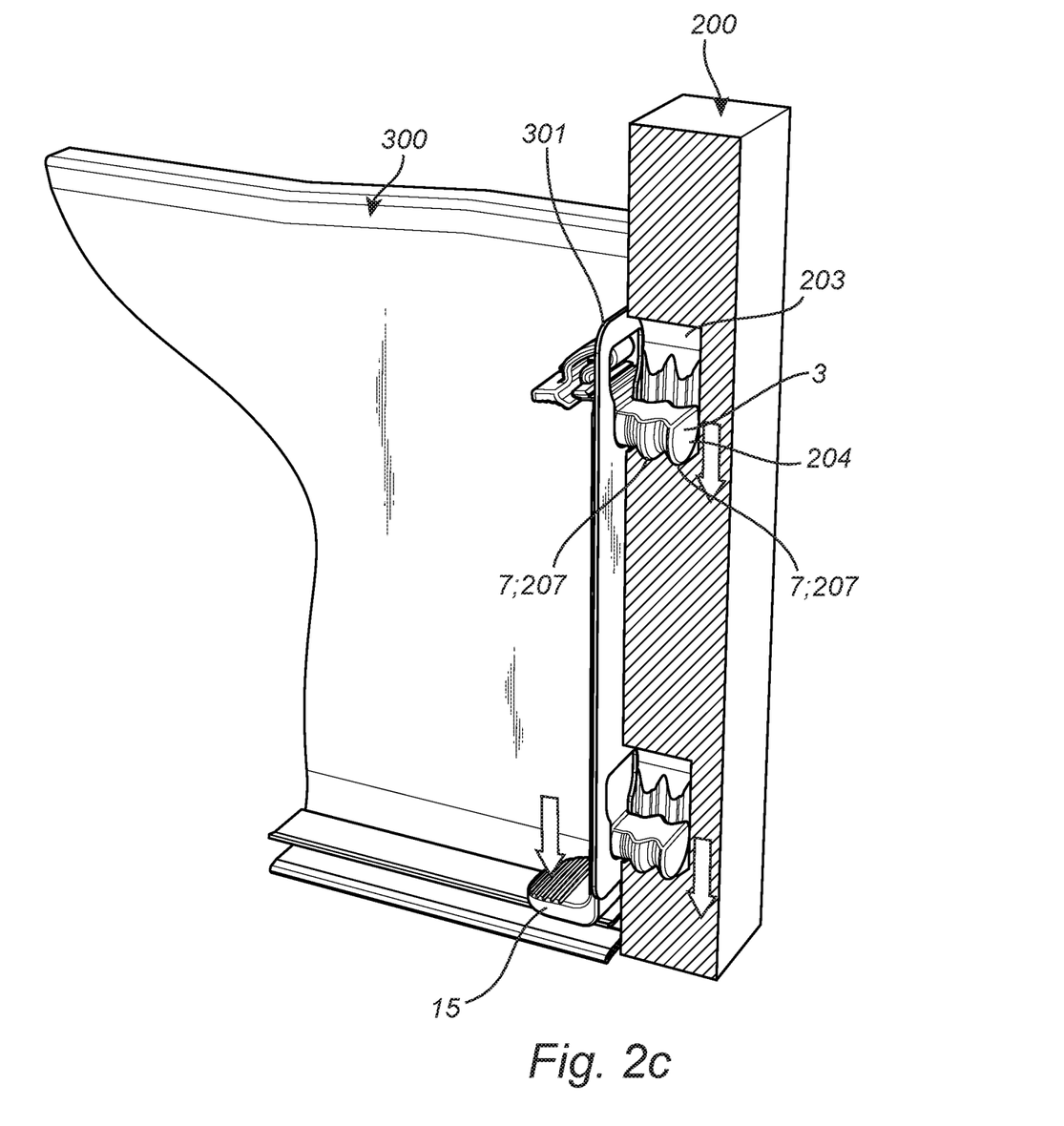

When fully inserted, see FIG. 2C, the connector bracket 1 is pushed linearly by applying a force to the connector bracket 1 in a direction transverse to the longitudinal extension of the protrusions 3. The pushing is facilitated by the operator applying a pressure by her thumb on the actuator 15. The tolerances between the protrusions 3 and the recess 201 may be designed and dimensioned to require a force of about 400-100 N and more preferred 50-70 N.

During the pushing, the protrusions 3 will be moved from the insertion portions 203 of the respective recess 201 towards the locking portion 204 of the respective recess 201. As a result, the rims 7 engage the grooves 207 in the inner wall of the locking portion 204, thereby counteracting relative movement between the first furniture part 200 and the connector bracket 1 along the longitudinal extension of the protrusions 3.

Figure 2D:
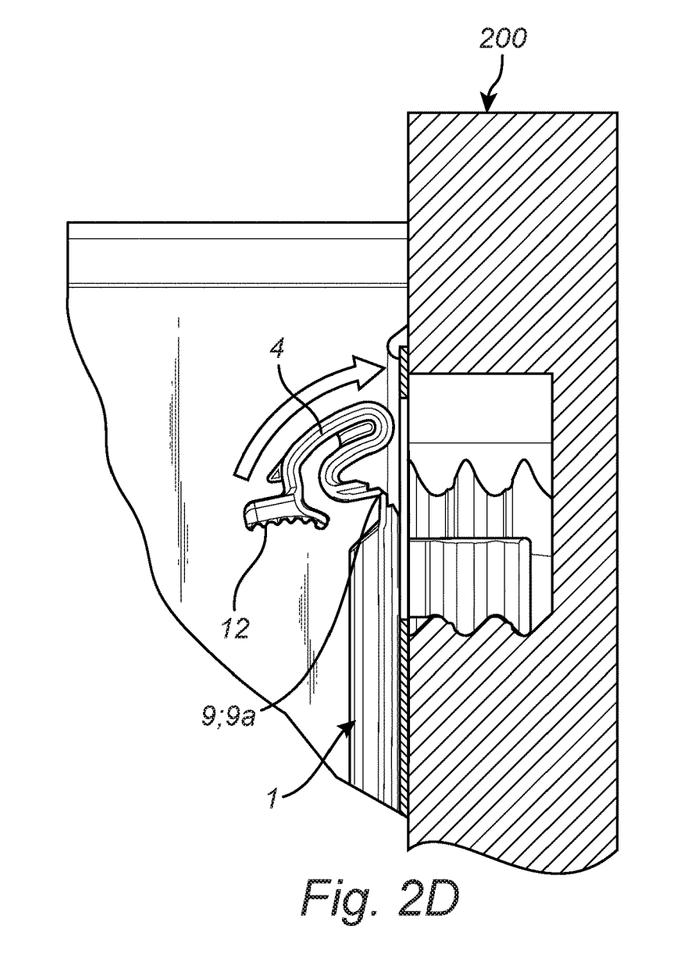
Figure 2E:
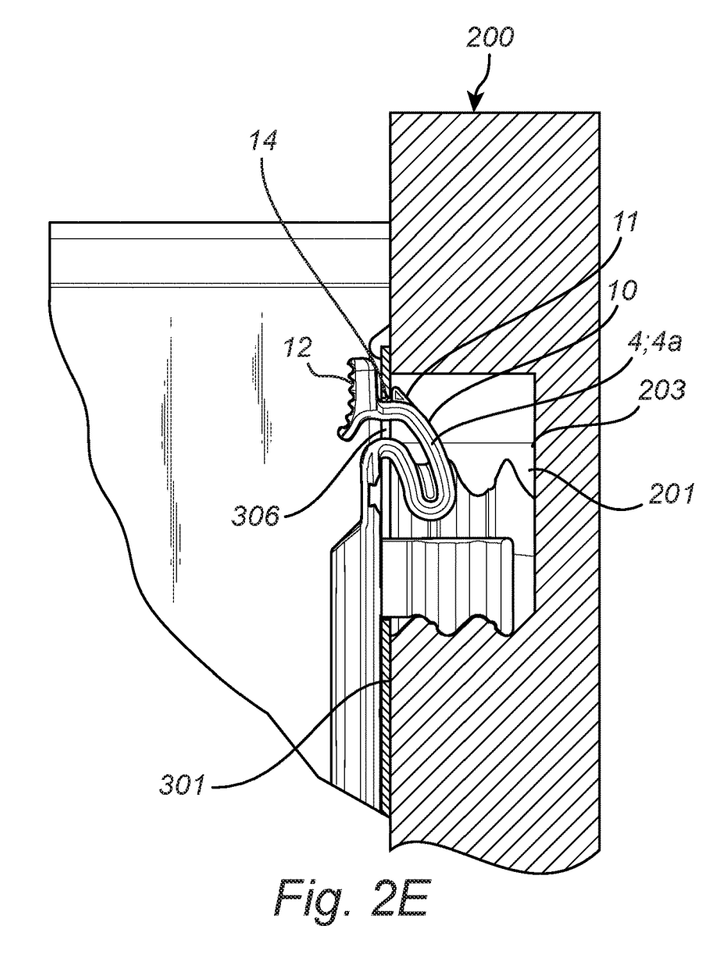

Now turning to FIGS. 2D and 2E. When the connector bracket 1 has been moved to its locked position, the locking element 4 formed by the flexible tongue 4a is pushed towards the first furniture part 200. This is made by the operator applying a pressure on the tongue actuator 12. During this pushing, the flexible tongue 4a will pivot around the hinge 9a. As a result, the flexible tongue 4a, see FIG. 2E, is moved through the through-going hole 306 in the thin-walled portion 301 and into the insertion portion 203 of the recess 201. The bent neck portion 10 of the flexible tongue 4a is thereby received in the insertion portion 203 of the recess 201. Due to the flexibility of the flexible tongue 4a the shoulder 11 will during the same operation be moved past the thin-walled portion 301 to thereby abut the surface of the second furniture part 300 facing the first furniture part 200. The operator will receive an audial confirmation by a "click sound" as the shoulder 11 is moved past the thin-walled portion 301. The flexible tongue 4a will be maintained in the recess 201 by the shoulder 11 engaging the thin-walled portion 301. When set to this position, a part of the thin-walled portion 301 will be lockingly received in the gap 14 that is formed between the shoulder 11 and the tongue actuator 12. This is best seen in FIG. 2F.

When set to the locking position the bent neck portion 10 will act as a biasing means which urges the connector bracket 1 and its projections 3 towards the locking portion of the first furniture part 200 and thereby to maintain this locking position. The flexible tongue 4a will thereby prevent the protrusion 3 from being moved from the locking portion 204 to the insertion portion 203 and thereby releasing its engagement with the grooves 207. Accordingly, the locking element 4 is configured to form a safety lock adapted to act against a portion of an envelope surface of the protrusion 3 facing the insertion portion 203 of the recess 201.

Figure 2F:
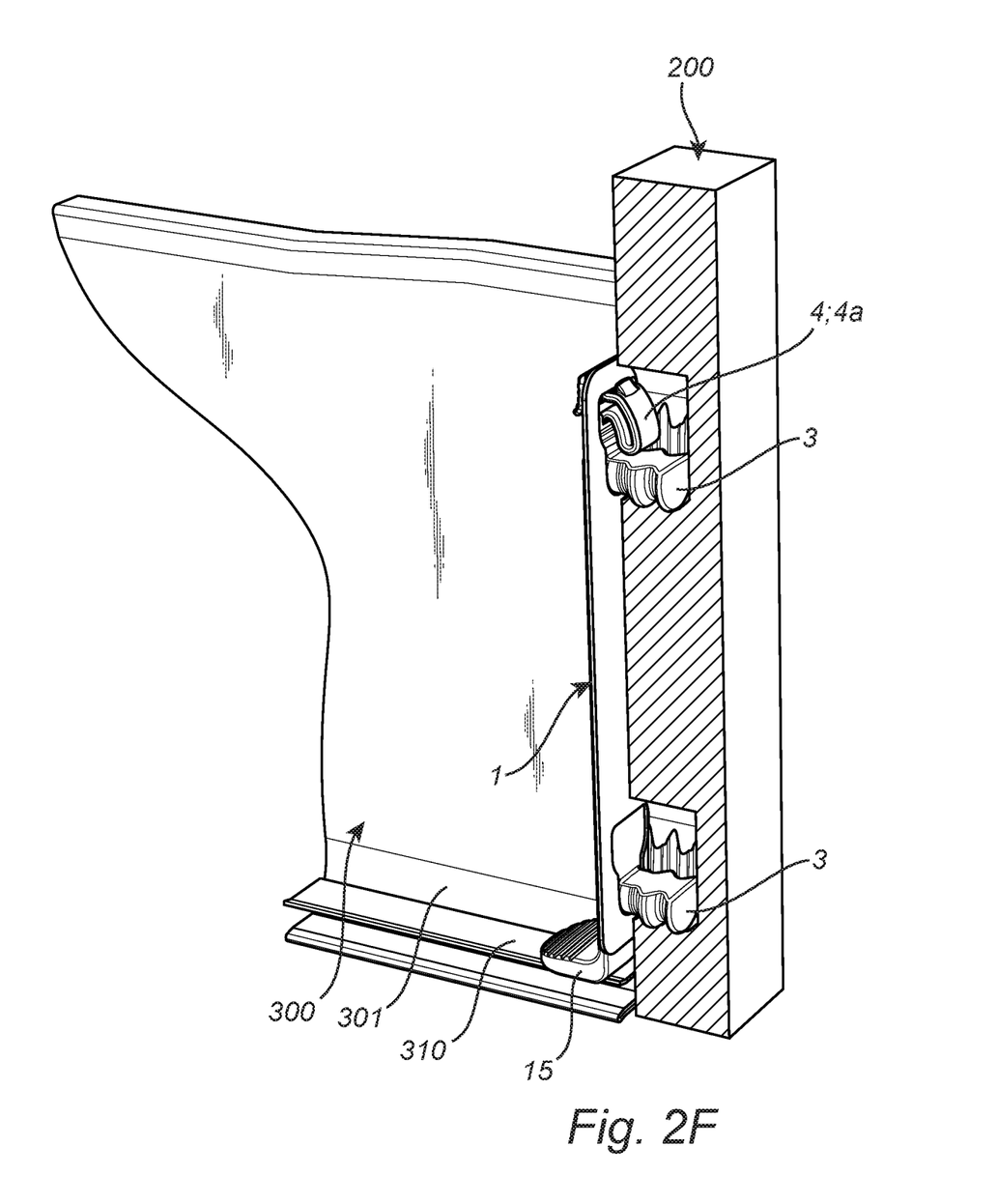

As is seen in FIG. 2F, when the connector bracket 1 has been set to the locked position, the actuator 15 preferably faces a lower edge portion 310 of the side wall 301 of the drawer. Thereby, the actuator does not interfere with the interior of the drawer.

In order to release the locking engagement between the connector bracket 1 and the first and second furniture parts 200, 300, the operator applies a bending force to the tongue actuator 12. The locking engagement between the shoulder 11 and the thin-walled element 301 will thereby be released. The flexible tongue 4a will then be allowed to be removed from the recess 201 and the connector bracket 1 to be displaced in view of the thin-walled element 301 and the first furniture part 200 to thereby release the engagement between the rims 7 and the grooves 207. Thereby the furniture can be dis-mounted or the first furniture part 200 replaced. The very same connector bracket 1 can be re-used.

The invention has been described as applied to a drawer. It is to be understood that the same principle is equally applicable to other types of furniture and also to one furniture part only. In case of one furniture part only, the second furniture part is omitted. Non-limiting examples of furniture parts are joists, pedestals, sockets, and fittings used in e.g. a wardrobe.

The connector bracket 1 has been defined as having at least one protrusion 3. The provision of two or more protrusions 3 is favourable since the connector bracket 1 thereby is prevented from rotating in view of the first furniture part 200. The skilled person will understand that the same locking principle is applicable also when using one protrusion 3 only. The locking element 4 may be used to prevent rotation.

In a non-disclosed embodiment, the recess 201 may be arranged in an insert that is configured to be countersunk into the surface of the first furniture part. Such insert may be an injection molded body.

The locking element 4 has been disclosed as being integral with the connector bracket 1. It is however to be understood that it may form a separate unit, such as a plug, that is pressed into the insertion portion 203 of the recess 201 after the connector bracket 1 has been set to its locking position.

The base portion 2 has been described as a generally flat body. It is to be understood that its front surface may be provided with non-disclosed features such as hooks or mounts in order for the connector bracket 1 to also be used as a fitting in e.g. a wardrobe.

The invention claimed is:

1. A system comprising a first furniture part, a second furniture part, and a locking arrangement comprising a connector bracket and a locking element, wherein the first furniture part comprises a recess having an oblong shape comprising an insertion portion and a locking portion, wherein the locking portion along an inner wall comprises a groove;

wherein the second furniture part comprises a through-going hole;

the connector bracket comprises a base portion having two opposing surfaces forming a front surface and a rear surface, an extension adapted to extend along the first furniture part, and a protrusion arranged on the rear surface of the base portion, the protrusion having a longitudinal extension extending transverse the extension of the base portion and comprising a rim extending transverse the longitudinal extension of the protrusion;

wherein the protrusion is configured to be inserted into the through-going hole of the second furniture part and into the insertion portion of the recess of the first furniture part and to be movable from the insertion portion of the recess to the locking portion of the recess, by applying a force to the connector bracket such that the connector bracket moves linearly in a direction transverse to the longitudinal extension of the protrusion, whereby the rim of the protrusion engages the groove in the inner wall of the locking portion, thereby counteracting relative movement between the first furniture part and the connector bracket along the longitudinal extension of the protrusion;

wherein the locking element is integral with the connector bracket and is configured to extend through the through-going hole and to be inserted into the insertion portion of the recess, thereby preventing the protrusion from being moved from the locking portion of the recess to the insertion portion of the recess to release engagement with the groove along the inner wall of the locking portion of the recess, and wherein the locking element is a flexible tongue which, when the locking element has been inserted into the insertion portion of the recess, is configured to pivot toward the rear surface of the base portion of the connector bracket to form a safety lock adapted for acting against a portion of an envelope surface of the protrusion facing the insertion portion of the recess.

2. The system according to claim 1, wherein the second furniture part comprises a thin-walled portion having the through-going hole, and wherein the protrusion is configured to be inserted into and extend through the through-going hole before being inserted into the insertion portion of the recess.

3. The system according to claim 2, wherein the locking element comprises a shoulder which is configured to, when the locking element has been inserted into the insertion portion of the recess, abut a surface of the second furniture part facing the first furniture part.

4. The system according to claim 1, wherein the connector bracket further comprises an actuator facilitating force transfer to the connector bracket in a direction transverse the longitudinal extension of the protrusion when moving the connector bracket to a locking position.

5. The system according to claim 1, wherein protrusion comprises a first protrusion, the connector bracket comprises a second protrusion, the recess comprises a first recess, the first furniture part comprises a second recess, the through-going hole comprises a first through-going hole, and the second furniture part comprises a second through-going hole.

6. A connector bracket adapted to form part of a locking arrangement configured to lockingly interconnect the connector bracket with at least a first furniture part, said first furniture part comprising a recess having an oblong shape comprising an insertion portion and a locking portion, wherein the locking portion along an inner wall comprises a groove; the connector bracket comprising:

a base portion having two opposing surfaces forming a front surface and a rear surface, an extension adapted to extend along the first furniture part, and a protrusion arranged on the rear surface of the base portion, the protrusion having a longitudinal extension extending transverse the extension of the base portion and comprising a rim extending transverse the longitudinal extension of the protrusion;

wherein the protrusion is configured to be inserted into the insertion portion of the recess and to be movable from the insertion portion of the recess to the locking portion of the recess by moving the connector bracket in a direction transverse to the longitudinal extension of the protrusion, whereby the rim of the protrusion engages the groove in the inner wall of the locking portion, thereby counteracting relative movement between the first furniture part and the connector bracket along the longitudinal extension of the protrusion; and a locking element which is integral with the connector bracket and which comprises a flexible tongue adapted to be movable between an unlocked position and a locked position, wherein the flexible tongue in the locked position is arranged to extend into the insertion portion of the recess of the first furniture part, and wherein the flexible tongue, when the locking element has been inserted into the insertion portion of the recess, is configured to pivot toward the rear surface of the base portion of the connector bracket to form a safety lock adapted for acting against a portion of an envelope surface of the protrusion facing the insertion portion of the recess.

7. The connector bracket according to claim 6, wherein the base portion comprises the protrusion and another protrusion arranged a distance from each other along the extension of the base portion.

8. The connector bracket according to claim 6, wherein the protrusion is adapted to be inserted into and extend through a through-going hole of a thin-walled portion of a second furniture part before being inserted into the insertion portion of the recess of the first furniture part.

9. The connector bracket according to claim 8, wherein the flexible tongue comprises a shoulder configured to, when the flexible tongue has been moved to the locked position, abut a surface of the second furniture part facing the first furniture part.

10. The connector bracket according to claim 6, wherein the connector bracket further comprises an actuator configured to facilitate force transfer to the connector bracket in a direction transverse the longitudinal extension of the protrusion.

11. The connector bracket according to claim 6, wherein the connector bracket is lockingly interconnected to the first furniture part and a second furniture part.

* * * * *